J. W. SMITH.
REVOLVING-HARROWS.
No. 195,177. Patented Sept. 11, 1877.
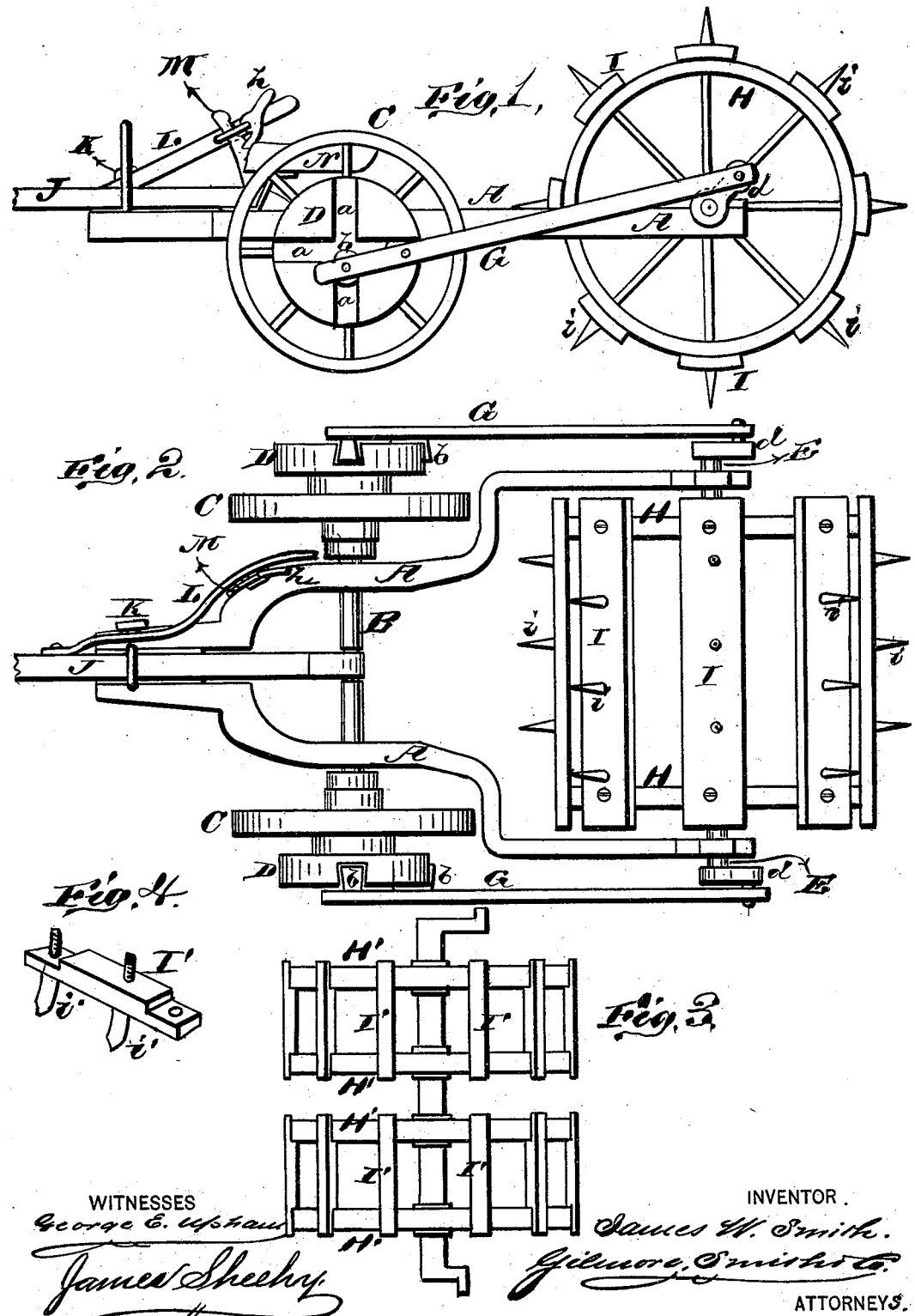
WITNESSES
George E. Upshaw
James Sheehy
INVENTOR
James W. Smith
Gilmore, Smith & Co.
ATTORNEYS

UNITED STATES PATENT OFFICE.

JAMES W. SMITH, OF FANCY CREEK, KANSAS.

IMPROVEMENT IN REVOLVING HARROWS.

Specification forming part of Letters Patent No. 195,177, dated September 11, 1877; application filed June 30, 1877.

*To all whom it may concern:*

Be it known that I, JAMES W. SMITH, of Fancy Creek, in the county of Clay and State of Kansas, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my harrow. Fig. 2 is a plan view, and Figs. 3 and 4 are details of the same.

The nature of my invention consists in the construction and arrangement of a harrow, as will be hereinafter more fully set forth.

The annexed drawing, to which reference is made, fully illustrates my invention.

The frame of my harrow consists of two beams, A A, the rear portions of which run parallel to each other, and their front portions are bent inward and then forward, and their extreme front ends united together, as shown.

In suitable boxes under the front part of the frame thus formed is placed the axle B, having near each end a driving-wheel, C. This wheel is connected to the axle by a pawl-and-ratchet device, whereby the axle will be rotated as the wheel turns forward; but in going backward the wheels will turn on the axle.

Outside of the wheel C, on each end of the axle B, is secured a wheel or disk, D, having two diametrical grooves, *a a*, crossing each other at right angles, forming what is known as a "trammel"-wheel. In the grooves *a a* are placed blocks or shoes, *b b*, pivoted to a pitman, G, which connects with a crank, *d*, on the end of a shaft, E, having its bearings in boxes on the ends of the bars A A.

On this shaft, between said bars, are secured two wheels, H H, connected by means of a series of cross-bars, I I, in which the teeth *i i* are fastened. This forms the rotating harrow-cylinder, which is revolved at twice the speed of the driving-wheels C, whereby the clods are more thoroughly pulverized and the ground leveled. At the same time the revolution of the harrow at increased speed aids and lightens the draft to a considerable extent.

J is the tongue, pivoted to the axle B, as shown, and provided with a lever, L, pivoted to a standard, K. The lever L is adjusted and held by a pawl, *h*, in a ratchet, M, to raise and lower the harrow-cylinder, as required. N is the driver's seat.

The harrow may be exchanged for a cultivator, which consists of the central shaft, with two pairs of wheels, H', the wheels of each pair connected by cross-bars I', having the cultivator-teeth *i'* secured to them.

The two pairs of wheels H' may be adjusted on the shaft to increase or diminish the distance between them, as required for the row.

What I claim as new, and desire to secure by Letters Patent, is—

The harrow-cylinder frame A, pivoted near its front end to the axle B, carrying the drive-wheels C and grooved disks D, and provided with the standard K, ratchet M, and pawl *h*, in combination with the shaft E, provided with cranks *d*, pitmen G, having blocks *b*, and tongue J pivoted to the axle, all constructed and operated as shown and described.

In testimony that I claim the above I have hereunto subscribed my name in the presence of two witnesses.

JAMES W. SMITH.

Witnesses:
ELMER M. SPERRIER,
SAMUEL DAVIDSON.